US012493293B2

(12) United States Patent
Likhachev et al.

(10) Patent No.: US 12,493,293 B2
(45) Date of Patent: Dec. 9, 2025

(54) MULTI-DIMENSIONAL EXTENDED TRAJECTORY PLANNING WITH CHANGING DIMENSIONALITY BASED ON HORIZON STEPS

(71) Applicants: DENSO CORPORATION, Kariya (JP); Waymo LLC, Mountain View, CA (US)

(72) Inventors: Maxim Likhachev, Pittsburgh, PA (US); Ellis Ratner, Oakland, CA (US); Lu Lyu, Medford, MA (US); Abhinav Srinivas Sai Kiran Kunapareddy, Sunnyvale, CA (US); Savio Joseph Pereira, Blacksburg, VA (US); Jonathan Michael Butzke, Pittsburgh, PA (US); Yunfei Xu, Milpitas, CA (US); Takashi Bando, Mountain View, CA (US); Akihito Iwai, San Jose, CA (US)

(73) Assignees: DENSO CORPORATION, Kariya (JP); Waymo LLC, Mountain View, CA (US)

(*) Notice: Subject to any disclaimer, the term of this patent is extended or adjusted under 35 U.S.C. 154(b) by 755 days.

(21) Appl. No.: 17/706,127

(22) Filed: Mar. 28, 2022

(65) Prior Publication Data
US 2022/0317697 A1     Oct. 6, 2022

Related U.S. Application Data

(60) Provisional application No. 63/168,565, filed on Mar. 31, 2021.

(51) Int. Cl.
*G05D 1/00*     (2024.01)
*G06N 20/00*     (2019.01)

(52) U.S. Cl.
CPC .......... *G05D 1/0223* (2013.01); *G05D 1/0088* (2013.01); *G05D 1/0221* (2013.01); *G06N 20/00* (2019.01)

(58) Field of Classification Search
CPC .. G05D 1/0223; G05D 1/0088; G05D 1/0221; G06N 20/00; B60W 60/001
See application file for complete search history.

(56) References Cited

U.S. PATENT DOCUMENTS 10,860,010 B2 * 12/2020 Shimakawa ........... B25J 9/1671
12,147,920 B2 * 11/2024 Fox ..................... G06Q 10/0633
(Continued)

FOREIGN PATENT DOCUMENTS

EP     3610345 A1     2/2020
WO    WO-2020/03556     1/2020

OTHER PUBLICATIONS

International Search Report and Written Opinion of the International Searching Authority regarding International Patent Application No. PCT/US2022/022432, dated Jul. 8, 2022.
(Continued)

*Primary Examiner* — Rami Khatib
(74) *Attorney, Agent, or Firm* — Harness, Dickey & Pierce, P.L.C.

(57) ABSTRACT

A multi-dimensional trajectory planning system is disclosed that includes planning and actuator modules. The planning module executes the planning application to: determine a first dimensionality including first dimensions for a first stage, where each of the first dimensions are active, and where the first dimensions include two or more dimensions; determine a second dimensionality including second dimensions for a second stage, where the second dimensions include the first dimensions or a subset of the first dimensions, and where the second stage has a lower level of dimensionality than the first stage; based on map data and
(Continued)

sensor data, estimates first possible future states of the first dimensions for the first stage, and estimates second possible future states of the second dimensions for the second stage based on the first possible future states; and selects a trajectory plan based on the second possible future states.

36 Claims, 6 Drawing Sheets

(56) References Cited

U.S. PATENT DOCUMENTS

| | | | | |
|---|---|---|---|---|
| 12,236,730 | B2* | 2/2025 | Volos | G06Q 40/08 |
| 2019/0391580 | A1* | 12/2019 | Di Cairano | G08G 1/165 |
| 2020/0159225 | A1 | 5/2020 | Zeng et al. | |
| 2021/0114629 | A1* | 4/2021 | Komuro | B60W 30/0956 |
| 2021/0278843 | A1* | 9/2021 | Li | G06T 17/00 |
| 2022/0224941 | A1* | 7/2022 | Sugio | H04N 19/136 |

OTHER PUBLICATIONS

"Path Planning in Dynamic Environments with Adaptive Dimensionality" by Anirudh Vemula and Katharina Muelling and Jean Oh; Robotics Institute, Carnegie Mellon University; May 22, 2016 (9 pages).

"Time-bounded Lattice for Efficient Planning in Dynamic Environments" by Aleksandr Kushleyev (Electrical and Systems Engineering) and Maxim Likhachev (Computer and Information Science), University of Pennsylvania (7 pages).

"Search-based optimal motion planning for automated driving" by Zlatan Ajanovic, Bakir Lacevic, Barys Shyrokau, Michael Stolz and Martic Horn; IROS 2018 (8 pages).

* cited by examiner

MULTI-DIMENSIONAL EXTENDED TRAJECTORY PLANNING WITH CHANGING DIMENSIONALITY BASED ON HORIZON STEPS

CROSS-REFERENCE TO RELATED APPLICATIONS

This application claims the benefit of U.S. Provisional Application No. 63/168,565 filed on Mar. 31, 2021. The entire disclosure of the above application is incorporated herein by reference.

FIELD

The present disclosure relates to vehicle trajectory planning systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A trajectory planning system for a vehicle can determine a target path for the vehicle to follow. The target path may be adjusted based on a changing environment. For example, a host (or ego) vehicle may approach or encounter one or more objects, such as fixed objects, pedestrians, and/or other vehicles and update the target path. If the vehicle is an autonomous vehicle, the vehicle may follow the updated target path to avoid a collision.

SUMMARY

This section provides a general summary of the disclosure, and is not a comprehensive disclosure of its full scope or all of its features.

A multi-dimensional trajectory planning system is disclosed that includes: a memory, a planning module, and an actuator module. The memory is configured to store map data, sensor data from sensors of a vehicle, and a planning application. The planning module is configured to execute the planning application to: determine a first dimensionality including a first set of dimensions for a first stage of a planning process, where each of the first set of dimensions are active, and where the first set of dimensions includes two or more dimensions; determine a second dimensionality including a second set of dimensions for a second stage of the planning process, where the second set of dimensions includes the first set of dimensions or a subset of the first set of dimensions, and where the second stage has a lower level of dimensionality than the first stage; based on the map data and the sensor data, estimate first possible future states of the first set of dimensions for the first stage, and estimate second possible future states of the second set of dimensions for the second stage based on the first possible future states; and select a trajectory plan based on the second possible future states. The actuator module is configured to perform one or more operations such that the vehicle follows the selected trajectory plan.

In other features, the first set of dimensions includes three or more dimensions. In other features, one or more dimensions in the first set of dimensions is limited. In other features, one or more dimensions in the second set of dimensions is limited. In other features, the second set of dimensions includes only the subset of the dimensions in the first set of dimensions.

In other features, the first stage includes a first one or more layers. The second stage includes a second one or more layers. In other features, each of the first one or more layers and each of the second one or more layers is defined as being a predetermined number of one or more clock cycles for a respective future period.

In other features, the first stage includes a first one or more layers. The second stage includes a second one or more layers. Each of the first one or more layers and each of the second one or more layers is defined as being a respective predetermined distance from a current location of the vehicle.

In other features, the planning module is configured to: reduce dimensionality two or more times for transitioning between three or more stages, the three or more stages including the first stage and the second stage; determine possible future states for each of the three or more stages; generate scores by at least one of (i) scoring each of the possible future states of a last one of the three or more stages, or (ii) scoring a plan of each of the possible future states of a last one of the three or more stages; and select the trajectory plan based on the scores.

In other features, the planning module is configured to: reduce dimensionality three or more times for transitioning between four or more stages, the four or more stages including the first stage and the second stage; determine possible future states for each of the four or more stages; generate scores by at least one of (i) scoring each of the possible future states of a last one of the four or more stages, or (ii) scoring a plan of each of the possible future states of a last one of the four or more stages; and select the trajectory plan based on the scores.

In other features, the planning module is configured to maintain active a velocity dimension and an acceleration dimension for two or more stages, the two or more stages including the first stage and the second stage. In other features, the planning module is configured to maintain active a velocity dimension and an acceleration dimension for three or more stages, the three or more stages including the first stage and the second stage.

In other features, the planning module is configured to maintain one or more of the first set of dimensions active for each reduction in dimensionality of the planning process to select the trajectory plan and fixes or limits one or more dimensions of the first set of dimensions when transitioning between stages including transitioning between the first stage and the second stage.

In other features, the planning module is configured, when transitioning between the first stage and the second stage and when transitioning between the second stage and a third stage, to drop, fix or limit one or more dimensions of the first set of dimensions.

In other features, the planning module is configured, when limiting one or more dimensions for the second stage, to further limit possible states of the one or more dimensions than previously limited for the first stage such that there are fewer possible states for the second stage.

In other features, the second set of dimensions includes the dimensions in the first set of dimensions and one or more of the dimensions in the second set of dimensions is more limited than a same one or more dimensions in the first set of dimensions.

In other features, the planning module is configured, based on the map data and the sensor data, to: estimate the first possible future states of the first set of dimensions for one or more layers of the first stage; and estimate the second possible future states of the second set of dimensions for one or more layers of the second stage based on the first possible future states.

In other features, the planning module is configured to: generate first scores by scoring the second possible future states or scoring plans of the second possible future states, and select the trajectory plan based on the first scores.

In other features, the planning module is configured to: add the second possible future states to a list along with the first scores of the second possible future states, where the list includes (i) previously estimated possible future states estimated prior to estimating the first possible future states and the second possible future states, and (ii) second scores of the previously estimated possible future states; and select the trajectory plan based on the first scores and the second scores.

In other features, a multi-dimensional trajectory planning method is disclosed and includes: receiving map data; receiving sensor data from sensors of a vehicle; determining a first dimensionality including a first set of dimensions for a first stage of a planning process, where each of the first set of dimensions are active, and where the first set of dimensions includes two or more dimensions; determining a second dimensionality including a second set of dimensions for a second stage of the planning process, where the second set of dimensions includes the first set of dimensions or a subset of the first set of dimensions, and where the second stage has a lower level of dimensionality than the first stage; based on the map data and the sensor data, estimating first possible future states of the first set of dimensions for the first stage, and estimating second possible future states of the second set of dimensions for the second stage based on the first possible future states; selecting a trajectory plan based on the second possible future states; and performing one or more operations such that the vehicle follows the selected trajectory plan.

In other features, the first set of dimensions includes three or more dimensions. In other features, one or more dimensions in the first set of dimensions is limited. One or more dimensions in the second set of dimensions is limited. In other features, the second set of dimensions includes only the subset of the dimensions in the first set of dimensions.

In other features, the first stage includes a first one or more layers. The second stage includes a second one or more layers. Each of the first one or more layers and each of the second one or more layers is defined as being a predetermined number of one or more clock cycles for a respective future period.

In other features, the first stage includes a first one or more layers. The second stage includes a second one or more layers. Each of the first one or more layers and each of the second one or more layers is defined as being a respective predetermined distance from a current location of the vehicle.

In other features, the method further includes: reducing dimensionality two or more times for transitioning between three or more stages, the three or more stages including the first stage and the second stage; determining possible future states for each of the three or more stages; generating scores by at least one of (i) scoring each of the possible future states of a last one of the three or more stages, or (ii) scoring a plan of each of the possible future states of a last one of the three or more stages; and selecting the trajectory plan based on the scores.

In other features, the method further includes maintaining active a velocity dimension and an acceleration dimension for two or more stages, where the two or more stages including the first stage and the second stage.

In other features, the method further includes maintaining one or more of the first set of dimensions active for each reduction in dimensionality of the planning process to select the trajectory plan and fixes or limits one or more dimensions of the first set of dimensions when transitioning between stages including transitioning between the first stage and the second stage.

In other features, the method further includes, when transitioning between the first stage and the second stage and when transitioning between the second stage and a third stage, dropping, fixing or limiting one or more dimensions of the first set of dimensions.

In other features, the method further includes, when limiting one or more dimensions for the second stage, further limiting possible states of the one or more dimensions than previously limited for the first stage such that there are fewer possible states for the second stage.

In other features, the second set of dimensions includes the dimensions in the first set of dimensions and one or more of the dimensions in the second set of dimensions is more limited than a same one or more dimensions in the first set of dimensions.

In other features, the method further includes, based on the map data and the sensor data: estimating the first possible future states of the first set of dimensions for one or more layers of the first stage; and estimating the second possible future states of the second set of dimensions for one or more layers of the second stage based on the first possible future states.

In other features, the method further includes: generating first scores by scoring the second possible future states or scoring plans of the second possible future states; and selecting the trajectory plan based on the first scores.

In other features, the method further includes: adding the second possible future states to a list along with the first scores of the second possible future states, where the list includes (i) previously estimated possible future states estimated prior to estimating the first possible future states and the second possible future states, and (ii) second scores of the previously estimated possible future states; and selecting the trajectory plan based on the first scores and the second scores.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4A:
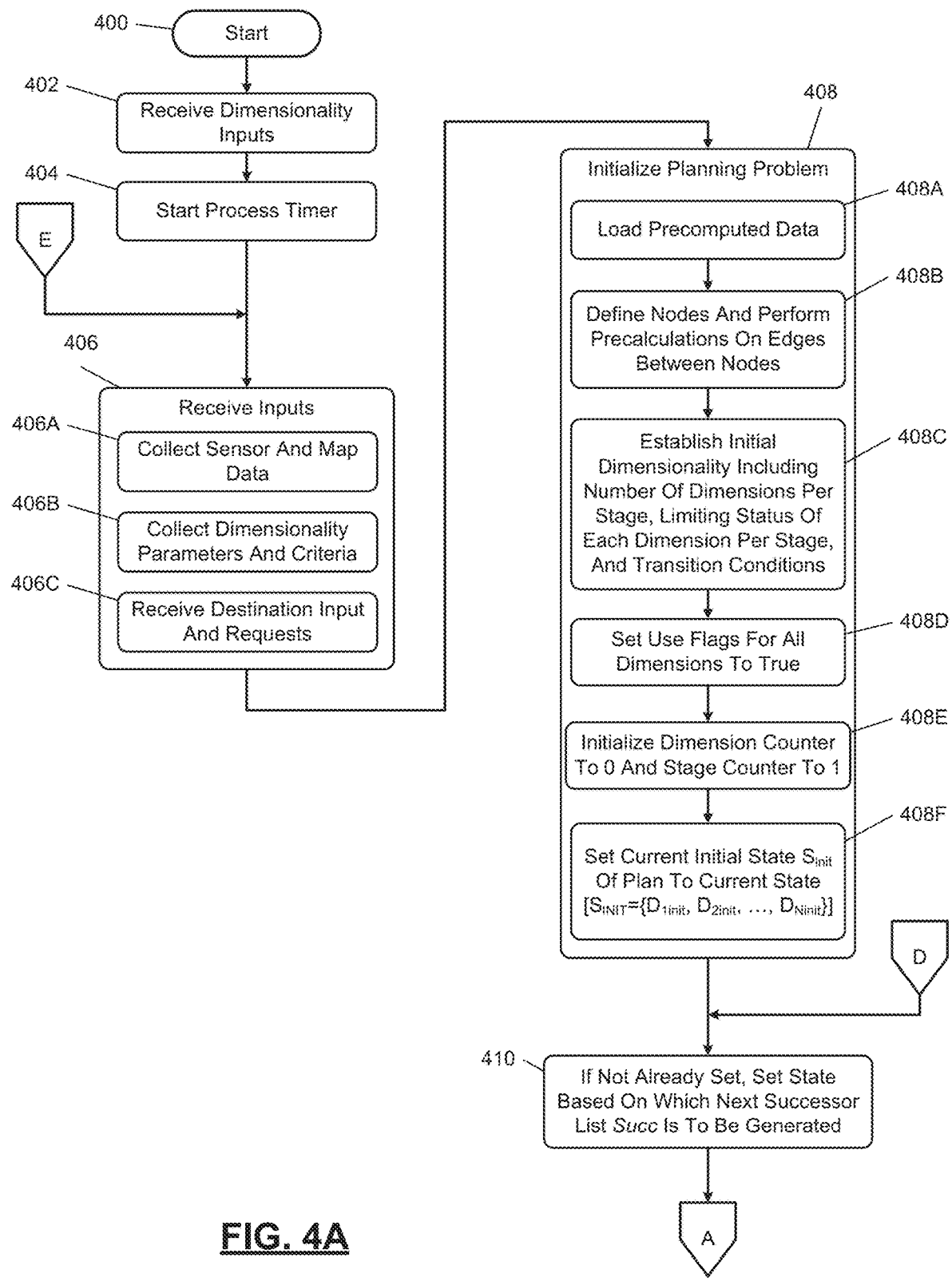
Figure 4B:
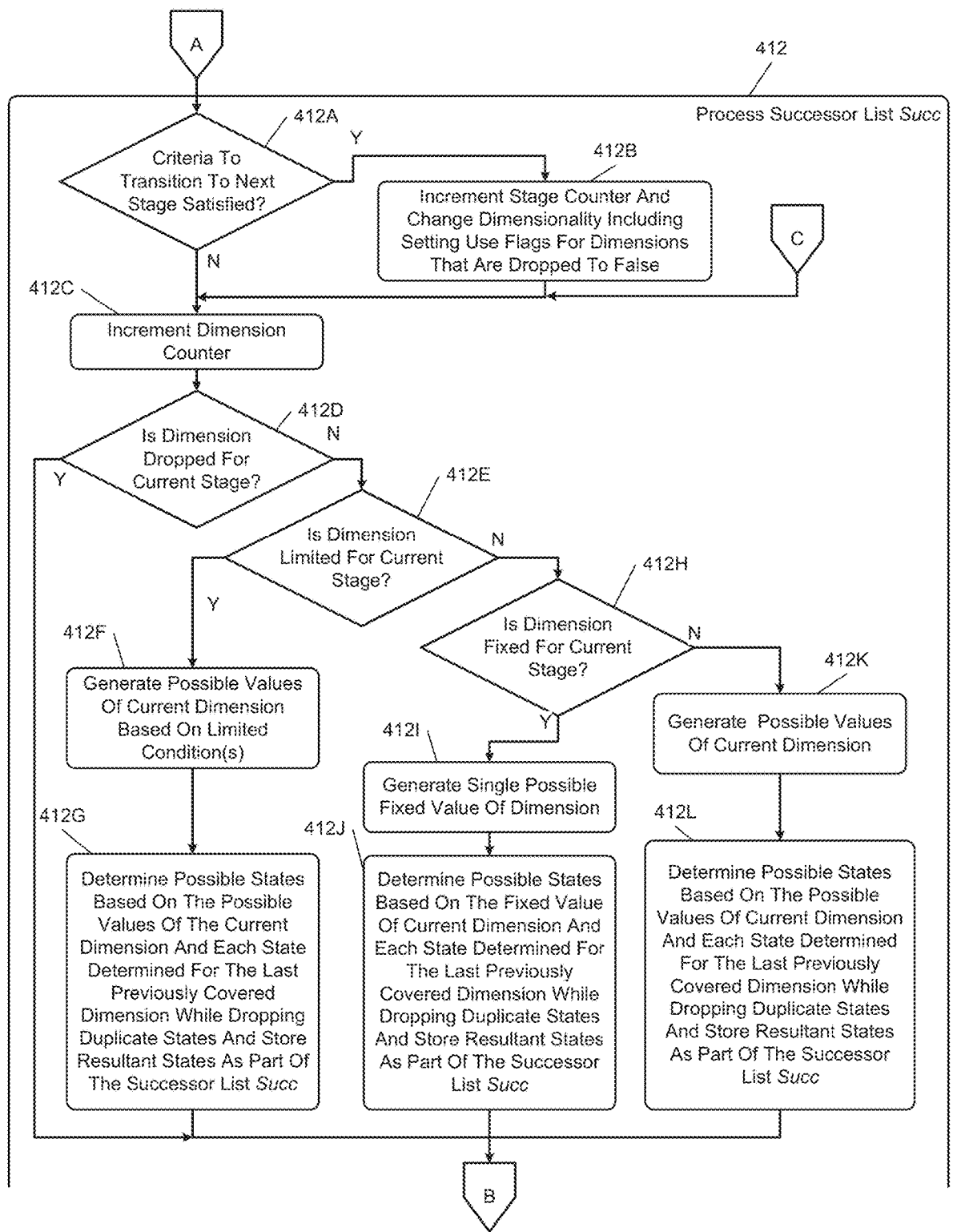
Figure 4C:
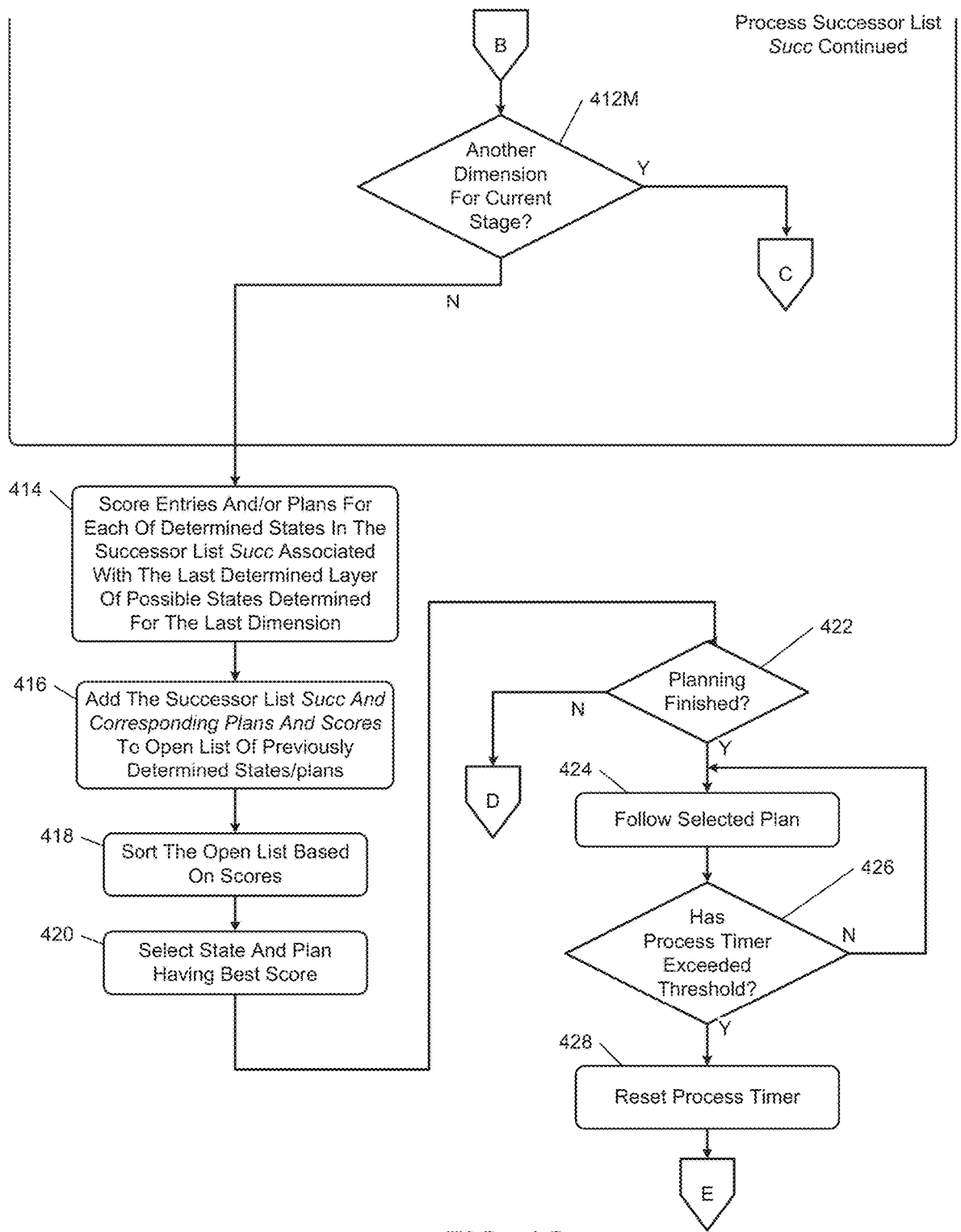

FIGS. 4A-C illustrates an example multi-stage planning method with varying dimensionality in accordance with the present disclosure.

Corresponding reference numerals indicate corresponding parts throughout the several views of the drawings.

DETAILED DESCRIPTION

Planning feasible collision free trajectories is a computationally complex and intensive process. The number of computations increases significantly the farther into the future the trajectory system plans. When the number of computations is restricted, a trajectory system may be limited as to how far into the future the trajectory system is able and/or permitted to plan. This is referred to as restricting the time horizon of the trajectory system.

Restricting the time horizon prevents an autonomous vehicle from being able to make long-term plans. For example, a typical lane-change can take about 8 seconds. If the time horizon is restricted to less than 8 seconds, a trajectory planning system of the autonomous vehicle may be unable to fully evaluate whether to perform a lane change and in which lane to move into.

The number of computations performed for trajectory planning may also be reduced by approximating solutions (e.g., approximating distances, locations, timing, etc.) to lessen the computational load. However, this introduces issues such as differences between the approximations and actual vehicle conditions leading to planning failures or control failures. A planning failure refers to when a trajectory planning system is unable to determine a plan due to time and/or system constraints. If the trajectory system, for example, had sufficient time to approximate solutions, then the planning system would have otherwise been able to determine a plan. A control failure refers to generation of a plan that is not capable of being executed by the host vehicle.

The examples set forth herein include a multi-dimensional planning system (MDPS) for autonomous driving that improves safety by allowing for increased look ahead distances by increasing a planning horizon. The disclosed MDPS is configured for generating long term plans while minimizing and limiting the corresponding computational effort associated with generating the long-term plans. The long-term plans result in safe vehicle maneuvers by allowing the vehicle to, for example, change lanes and perform other maneuvers earlier and avoid drastic last-second changes in heading. The long planning horizon also improves anticipation efforts of upcoming hazards and allows the vehicle to be more proactive, which further increases safety and improves comfort for passengers of the vehicle.

The MDPS performs a planning method that includes changing dimensionality over time to minimize an amount of computational effort and complexity in determining a target trajectory to follow. The term "dimensionality" refers to the number of active dimensions being estimated for a current stage and layer in time. The term "dimensions" refers to variables being monitored, estimated, updated, etc. The variables may include location (e.g., longitudinal and lateral vehicle positions), vehicle speed, vehicle acceleration, vehicle orientation, vehicle wheel angle, vehicle rotational velocity, vehicle steering rate, number of traffic lanes, number of positions per traffic lane, etc. A "stage" refers to a number of dimensions and a limited status of each of the dimensions for one or more layers (or cycles) of a planning process, which is implemented to determine a target trajectory. A stage may refer to a set of multiple layers (or consecutive cycles) of a planning process as further described below. Dimensionality also refers to criteria for changing between stages. The criteria to change between a first two stages may be the same or different than the criteria to switch between other stages.

When transitioning between stages, the limited status of active dimensions may change. When transitioning from a first stage to a second stage, one or more of the dimensions may be limited, further limited if already limited, fixed, or placed inactive. When inactive, states of that dimension are no longer estimated. When a dimension is limited, the limited status of a dimension may become more limited in one or more subsequent stages of the planning process such that there are fewer possible values of that dimension for each of the subsequent stages. This may occur multiple times. The level of dimensionality decreases with each subsequent stage of the planning process such that there are fewer possible states of the dimensions with each subsequent stage of the planning process. The dimensionality is reset when a subsequent target trajectory is determined and the planning process is repeated.

The multi-dimensional aspect of planning allows for extended planning horizons without the computational load of performing full-dimensional planning. The amount of computational effort depends on (i) the dimensionality at each stage and layer of a planning process, and (ii) the length of time into the future being considered. The disclosed planning system performs trajectory planning operations in an intelligent, adaptable, and consistent manner. The planning system may be implemented in an autonomous vehicle and account for a wide range of dimensions when constructing a planned path of motion. The dimensions may have a given hierarchy for changing the corresponding limited and/or active status over a set number of stages of a processing plan. The hierarchy may indicate the order in which estimates of active dimensions are determined over a set number of stages of a processing plan, as further described below.

Example embodiments will now be described more fully with reference to the accompanying drawings.

Figure 1:
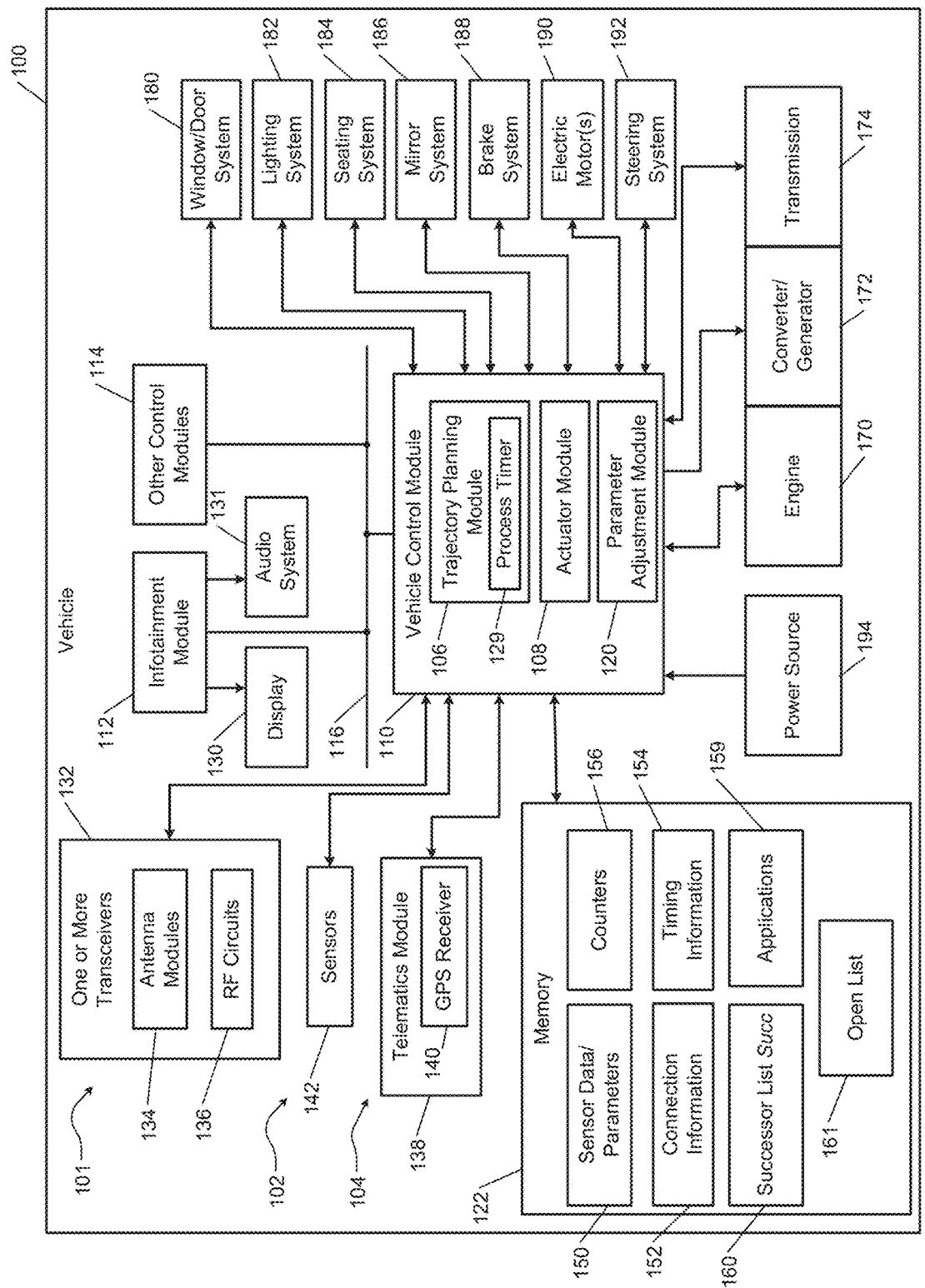
FIG. 1 is a functional block diagram of a vehicle including an example multi-dimensional planning system in accordance with the present disclosure.

FIG. 1 shows a vehicle 100 including a MDPS 101. The vehicle may be a fully or partially autonomous vehicle. The MDPS 101 includes a sensor system 102, a map system 104, a planning module 106 and an actuator module 108. The sensor system 102 detects and classifies obstacles in the vicinity of the vehicle 100. The map system 104 is configured to determine details about upcoming environments, such as geometric limits of roadways, types of roads, obstacle locations, object locations, and other road characteristics and/or environmental information. The planning module 106 is configured to determine a trajectory (or plan) that the vehicle 100 should follow after ensuring the trajectory is collision free and is within geometric limits of roadways. An actuator module 108 is configured to execute the planned trajectory. The MDPS 101 may include other systems, devices, modules, etc. of the vehicle 100, some of which are referred to herein.

The sensor system 102 detects both static and dynamic obstacles in the vicinity of the vehicle 100 (also referred to as the ego vehicle or host vehicle). This information is provided to the planning module 106. A map generated by and/or monitored by the map system 104 contains the geometric shape and characteristics of a surrounding area in a format to allow the planning module 106 to determine where are allowable (permitted and feasible) driving areas, emergency driving areas, non-traversable areas and other semantic categories of a local road configuration.

The actuator module 108 takes the plan generated by the planning module 106 and converts it to wheel, brake, and accelerator commands to affect the speed, acceleration, and heading of the ego vehicle 100. The planning module 106 uses the map and obstacle information in order to determine a best trajectory for the ego vehicle 100 to meet a goal condition (e.g., a destination and vehicle state, such as parked). In an embodiment and as part of this determination, the planning module 106 generates a short-range trajectory for the actuator module 108 to execute at each time step. A time step may refer to one or more clock cycles and/or a predetermined number of clock cycles.

The planning module 106 may continuously determine where the vehicle should move to next, while accounting for local roads and any sensed static and/or dynamic objects. By increasing the time horizon over which the planning module 106 is determining a target trajectory, the planning module 106 is able to account for future actions of the vehicle earlier.

As an example, by estimating vehicle states farther in the future, the planning module 106 is able to ascertain that the vehicle 100 is approaching a roadway exit and direct the actuator module 108 to drive the vehicle 100 into a different traffic lane (e.g., far-right lane). This may be done to allow the vehicle 100 to exit earlier than if the planning module 106 had waited until the vehicle 100 was closer to the exit. By making this determination that the vehicle 100 needs to be in the far-right lane earlier, the planning module 106 is able to select the safest method of changing lanes without cutting off nearby traffic and/or causing an uncomfortable or unsafe ride condition for vehicle occupants. This is unlike, if the planning module 106 had a shorter time horizon and for this reason determines at the last-second that the vehicle 100 needs to change lanes, thereby forcing the vehicle 100 to make an abrupt, potentially unsafe maneuver in order to use the exit.

Planning far into the future can be computationally expensive and therefore traditional automotive processors have been incapable of planning more than a few seconds into the future. Specifically, planning takes a level of computational effort proportional to the number of dimensions evaluated raised to a power related to the length of the time over which planning takes place (i.e., the planning effort $\propto$ [number of dimensions evaluated]$^{Time\ Horizon}$).

The planning module 106 allows for increasing the time horizon of the plan by selectively reducing the number of dimensions being considered as vehicle actions farther in the future are evaluated. As an example, the planning module 106 may during a first stage of a planning process estimate states for the dimensions of: vehicle lateral position on a roadway (or track); vehicle longitudinal position (or station); vehicle velocity; vehicle average acceleration; and time. Estimated states for the stated five dimensions may be estimated for the first stage (or portion) of the plan. The first stage of the plan includes a first one or more layers. One or more of these five dimensions is limited, fixed and/or dropped during a second stage (or portion) of the plan. This may occur over one or more layers subsequent to the first one or more layers. When limiting a dimension, the possible values of that dimension is reduced. This may include reducing the range of values. As another example, limiting a dimension may refer to reducing a number of available values, for example, if the dimension is a number of lanes, then limiting the dimension may refer to reducing the number of available lane options.

When fixing a dimension, the dimension may be maintained at a current value or may be fixed to a different value, such as zero. For example, the planning module 106 may set an acceleration dimension to 0 meters per second, such that the ego vehicle 100 maintains a same speed throughout a section (e.g., middle section) of a plan. Continuing from this example, during a last section of the plan, the planning module 106 may restrict a vehicle track position to be along a traffic lane centerline. This may be done in addition to restricting the acceleration dimension. By performing these two limiting operations, (i) the number of corresponding computations is greatly reduced for developing a complete trajectory plan, as compared to if these two limiting operations were not performed, and (ii) the plan is able to estimate dimension states a significant distance into the future. Sections of the plan having fewer dimensions may include subsets of dimensions of sections of the plan with more dimensions. This aids in guaranteeing that transitions between each section of the plan exist and are able to be calculated.

Figure 2:
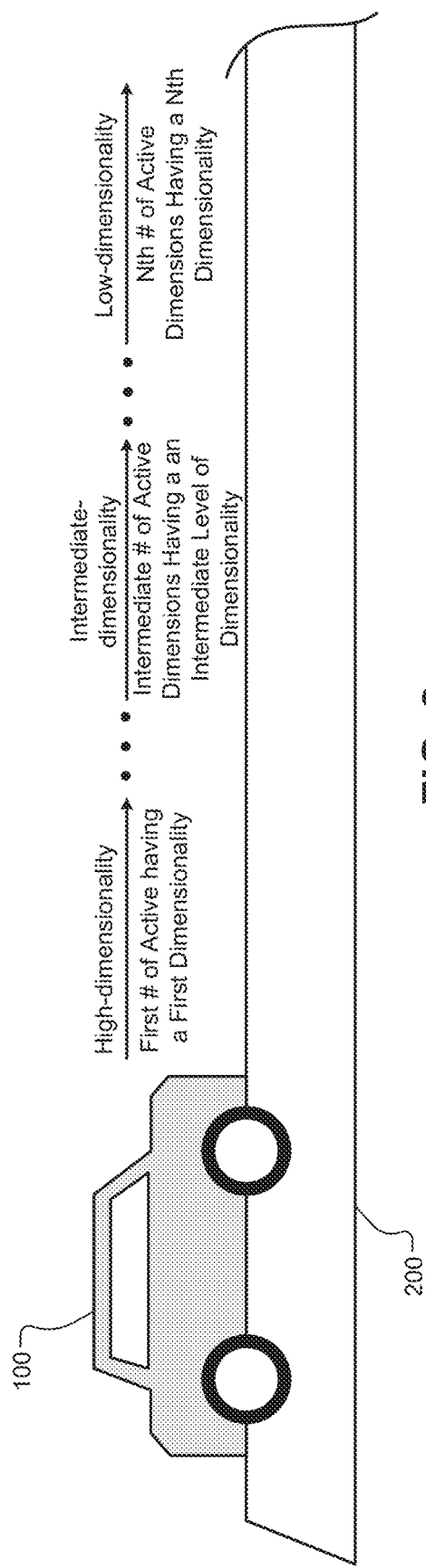
FIG. 2 is an example diagram illustrating different dimensions for different stages in time in accordance with the present disclosure.

FIG. 2 shows an example diagram illustrating different dimensions for different stages in time, which may be implemented by the planning module 106 of FIG. 1. The vehicle 100 is shown on a road 200. In the example shown, the number of active and/or non-fixed dimensions is reduced when transitioning between time steps and/or stages of the corresponding planning process. In the example shown, N levels of dimensionality are shown, where the dimensionality decreases over time, where N is an integer greater than or equal to three. In the example shown, the first level is referred to as a high-dimensionality level, the intermediate level is referred as a mid-dimensionality level, and the last (or Nth) level is referred to as a low-dimensionality level. The high-dimensionality level includes a first number of active dimensions that may all be unlimited or include one or more limited dimensions. The mid-dimensionality level includes a second number of active dimensions, where one or more may be fixed and/or limited dimensions. The low-dimensionality level includes a third number of active dimensions. The third number of active dimensions may include one or more dimensions. One or more of the third number of active dimensions may be fixed and/or limited.

The mid-dimensionality level has a lower dimensionality than the high-dimensionality level. The low-dimensionality level has a lower dimensionality than the mid-dimensionality level. The mid-dimensionality level may have fewer unlimited active dimensions and/or fewer active dimensions than the high-dimensionality level. Similarly, the low-dimensionality level may have fewer unlimited active dimensions or active dimensions than the mid-dimensionality level.

A dimension is active, when the planning module 106 is estimating one or more states for that dimension. When a dimension is inactive (or dropped), the planning module 106 is not estimating one or more states for that dimension. When a dimension is limited, the planning module 106 may: (i) select possible states (or values) of that dimension to be within a predetermined range that is smaller than the range for which states are estimated when the dimension is unlimited; (ii) select possible states (or values) from a reduced available number of states (or values), or (iii) fix the dimension to a particular value. The range of possible states for a dimension may be reduced multiple times when, for example, performing multiple stage transitions. For example, the range of a dimension may be reduced when transitioning between the high and mid dimensionality levels and reduced further when transitioning between the mid and low dimensionality levels.

As an example, the high-dimensionality level may include five unlimited active dimensions including longitudinal position s, lateral position tr, velocity v, time, and acceleration a. The first portion (or stage) of the plan, which may include one or more time steps (or layers), has all five of the dimensions active and unlimited. A second portion (or stage) of the plan, which may include one or more time steps (or layers), has four active unlimited dimensions and one fixed dimension (acceleration a=0), The third portion (or stage) of the plan, which may include one or more time steps (or layers), has three active unlimited dimensions and two fixed dimensions (lateral position tr=0 and acceleration a=0). The dimensionality may be reduced differently than stated and have more than two transitions and more than three stages. In one embodiment, at any time step, there are at least one or more active unlimited dimensions. In another embodiment, at any time step, there are at least one or more active dimensions.

The benefit of shifting from, for example, five dimensions down to three dimensions results in significant computational savings. For example, when the planning module 106 uses a first approach including estimating possible states for 5 dimensions, where each dimension could increase, decrease, or remain the same at any time step, then there are a total of 125 possible combinations of dimensions to calculate and evaluate. If using the first approach and the planning module 106 looks 4 time steps (or layers) into the future, there are 244 million possible states to calculate and evaluate. If, instead of using the first approach, a second approach is used and the number of dimensions is gradually reduced and/or limited across time steps of the planning process, then there are fewer possible states to calculate and evaluate. For example, if the second approach is used and all 5 dimensions are estimated for a first time step, 4 dimensions are estimated for a second time step, and 3 dimensions are estimated for third and fourth time steps, then there are only 6 million possible states to calculate and evaluate. As a result, for this example, the planning module 106 may evaluate an additional time step (or layer) into the future as there are substantially less total computations for 5 time steps into the future using the second approach than there are using the first approach for only 4 time steps into the future.

The planning module 106 sets which dimensions to be fix (or held constant) at future time steps. The planning module 106 then automatically determines how to transition between states at different time steps using predetermined rules for performing transitions. As the planning module 106 evaluates states further ahead in time, the planning module 106 may replace possible changed values with fixed values based on settings, thereby significantly reducing computational load in the process.

Figure 3:
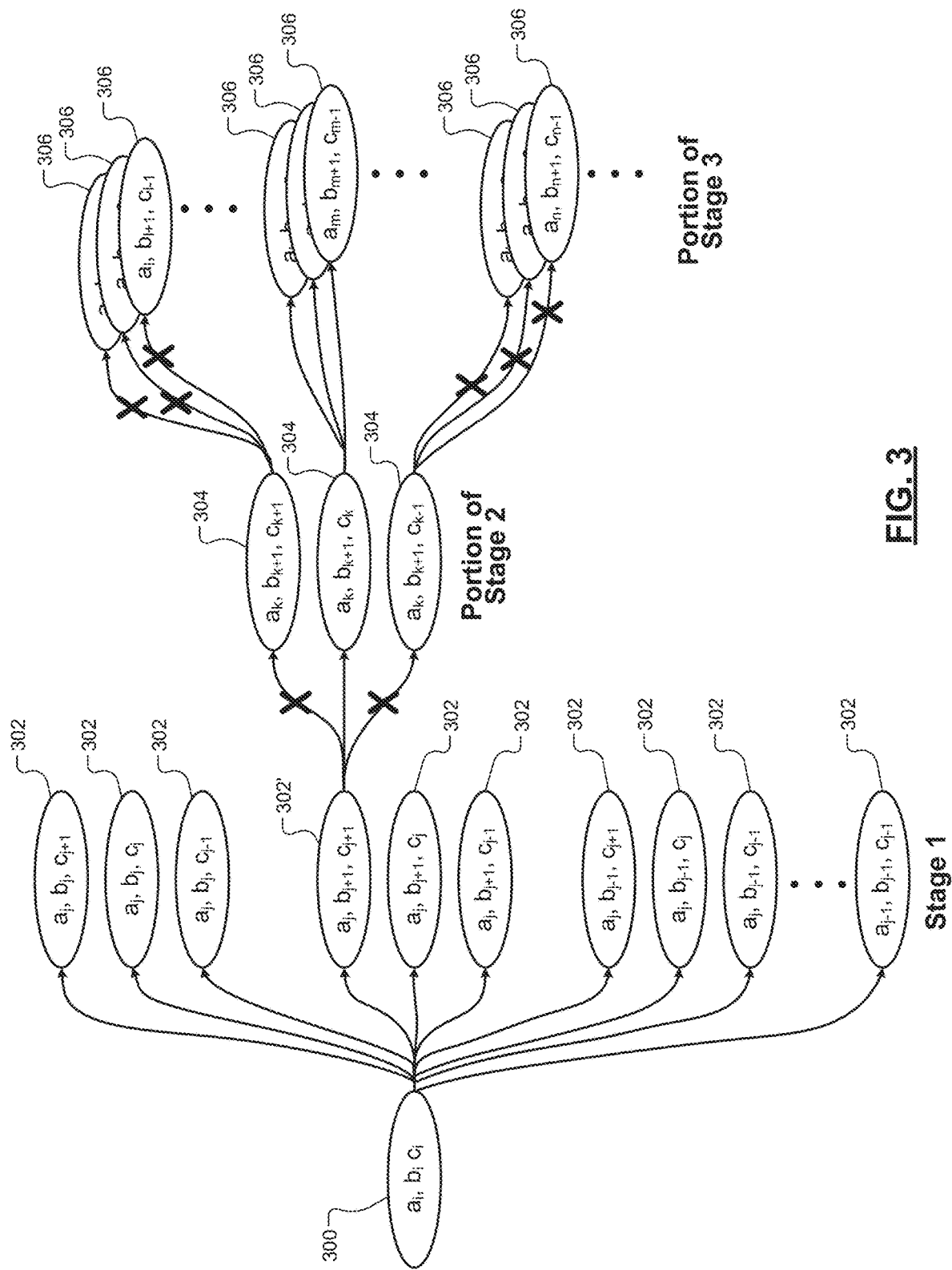
FIG. 3 is an example diagram illustrating a reduction in possible states due to limiting of a dimension for multiple stages of a processing plan in accordance with the present disclosure.

FIG. 3 shows a diagram illustrating a reduction is possible states due to a limiting of a dimension for multiple stages. Three dimensions a, b, c are shown with estimates for a first stage, a portion of the estimates for a second stage, and a portion of the estimates for a third stage. In the example shown, each dimension may remain constant, increase or decrease in value from an initial time step, designated 300 and including initial values $a_i$, $b_i$, $c_i$ of dimensions a, b, c. The states for the first stage are designated 302. The portion of states shown for the second stage are designated 304. The portion of the states shown for the third stage are designated 306. FIG. 3 shows possible states and combinations of dimensions a, b, c when there are three possible states for each of the three dimensions. The dimensions may have more than three possible states, for example, a dimension may have two different "increase" possible states two different "decrease" possible states. Each dimension may have any number of possible states.

For the example shown, if one of the dimensions is fixed, such as the dimension c, then the number of possible stages for subsequent time steps and/or stages is significantly reduced. This is illustrated by (i) the shown possible states that may occur when starting from one of the possible states 302 (designated stage 302') of the first stage, and (ii) 'X's shown in FIG. 3, which indicate some of the possible states that are not considered, determined and/or dropped due to the fixing of the dimension c at the value of the first stage, $c_k$.

As another example, for a self-driving vehicle there can be a large number of potential positions (or locations) laterally within a traffic lane. However, far into the future, there is no need to consider exactly where in each traffic lane the vehicle is located. Instead, the planning module 106 may consider a single position for each lane (e.g., a position at the centerline of the lane) and compare the position to other lane centerlines. Thus, the planning module 106 may limit a traffic lane position dimension to a predetermined number (or single) possible positions per traffic lane. This reduction in the number of options (or decrease in the dimensionality of the problem) allows for the planning module 106 to make estimations for significantly longer future time horizons for improved trajectory planning.

Referring again to FIG. 1, the vehicle 100 further includes a vehicle control module 110, an infotainment module 112 and other control modules 114 (e.g., a body control module). Although the planning module 106 is shown as part of the vehicle control module 110, the planning module 106 may be separate from the vehicle control module 110. The modules 106, 110, 112 and/or 114 may communicate with each other via vehicle interface 116, such as a controller area network (CAN) bus, a local interconnect network (LIN), a clock extension peripheral interface (CXPI) bus and/or other vehicle interfaces.

The vehicle control module 110 may control operation of vehicles systems and may include the planning module 106, the actuator module 108 and a parameter adjustment module 120, as well as other modules. The planning module 106 may include a process timer (or clock) 129. The process timer 129 may be used to determine the start time of the planning process which the planning module 106 may then use to calculate the transition times between stages. The vehicle control module 110 may also include one or more processors that are configured to execute instructions stored in a non-transitory computer-readable medium, such as the memory 122, which may include read-only memory (ROM) and/or random access memory (RAM).

The MDPS 101 may further include: a display 130; an audio system 131; and one or more transceivers 132 including antenna modules 134. The RF antenna modules 134 may include and/or be connected to RF circuits 136. The map system 104 of the MDPS 101 may include: a telematics module 138 including a global positioning system (GPS) receiver 140 and sensors 142. The RF circuits 136 may be used to communicate with mobile devices, central offices, other vehicles, land-based stations, cloud-based networks, etc. including transmission of Bluetooth®, wireless fidelity (Wi-Fi) or Wi-Fi direct and/or other RF signals satisfying various wireless communication protocols. The RF circuits 136 may include radios, transmitters, receivers, etc. for transmitting and receiving RF signals. The telematics module 138 may be implemented by a global navigation satellite system (e.g., GPS), inertial navigation system, global system for mobile communication (GSM) system, and/or other location system. The telematics module 138 may provide map information including road and object information, such as: locations, speed, acceleration, heading of vehicles; locations of objects; distances between objections; distances between a current location an intermediary and/or target destinations; etc.

The sensors 142 may include sensors used for planning and actuator operations, such as cameras, objection detection sensors, temperature sensors, accelerometers, vehicle velocity and/or speed sensors, and/or other sensors. The GPS receiver 140 may provide vehicle velocity and/or direction (or heading) of the vehicle and/or global clock timing information.

The memory 122 may store various sensor data, parameter data, dimension states, trajectory planning information and other information. As an example, the memory 122 may store sensor and parameter data 150, connection information 152, timing information 154, counters 156, applications 159, a successor list Succ 160 and an open list 161. The connection information 152 may refer to information for connecting to other vehicles, mobile access devices, central offices, local stations, etc. The timing information 154 may refer to, for example, conditions for transitioning between stages of a trajectory plan (also referred to simply as "a plan" or "the plan"). Transitions may be time based, based on traveled distance, and/or other condition. The counters 156 may include a dimension counter and a stage counter, which are further described below.

The applications 159 may be implemented by the modules 106, 108, 110, 112, 114, 120 and 138 and/or transceivers 132. The applications may include, for example, a planning application and an actuator application. The planning application may be executed by the planning module 106 to plan a trajectory of the vehicle 100. The actuator application may be executed by the actuator module 108 to implement a trajectory plan selected by the planning module 106. The parameter adjustment module 120 may be used to adjust parameters of the vehicle 100.

The successor list Succ 160 may include a list of currently generated possible states of dimensions at different future time steps and stages used for determining a trajectory plan. The successor list Succ 160 may be iteratively and periodically generated and added to the open list 161. The open list 161 contains a list of states to remaining be processed by the planning module 106. As an example, the successor list Succ 160 and/or the open list 161 may include anywhere between no entries up to millions of entries. These lists are further described below.

Although the memory 122 and the vehicle control module 110 are shown as separate devices, the memory 122 and the vehicle control module 110 may be implemented as a single device. The single device may include one or more other devices.

The vehicle control module 110 may control operation of an engine 170, a converter/generator 172, a transmission 174, a window/door system 180, a lighting system 182, a seating system 184, a mirror system 186, a brake system 188, electric motors 190 and/or a steering system 192 according to parameters set by the modules 106, 108, 110, 120, 134 and/or 138.

The vehicle control module 110 may receive power from a power source 194 that may be provided to the engine 170, the converter/generator 172, the transmission 174, the window/door system 180, the lighting system 182, the seating system 184, the mirror system 186, the brake system 188, the electric motors 190 and/or the steering system 192, etc. Some of the operations as a result of planning may include enabling fuel and spark of the engine 170, starting the electric motors 190, powering any of the systems referred to herein, and/or performing other operations as are further described herein. In one embodiment, the vehicle 100 does not include an engine and/or a transmission and the electric motors 190 are used for vehicle propulsion and/or driving purposes.

The engine 170, the converter/generator 172, the transmission 174, the window/door system 180, the lighting system 182, the seating system 184, the mirror system 186, the brake system 188, the electric motors 190 and/or the steering system 192 may include actuators controlled by the vehicle control module 110 to, for example, adjust fuel, spark, air flow, steering wheel angle, throttle position, pedal position, door locks, window position, seat angles, etc. This control may be based on the outputs of the sensors 142, the map system 104, the GPS receiver 140 and the above-stated data and information stored in the memory 122.

FIGS. 4A-C show a multi-stage planning method with varying dimensionality over time and stages. The multi-stage planning method determines possible future states of dimensions for future time steps and/or distances from an initial location. The multi-stage planning method may be implemented by the MDPS 101 of FIG. 1. Operations of the method may be primarily implemented by the planning module 106 to generate and select a best trajectory plan for a current moment in time. Certain operations may be implemented by the actuator module 108 to implement selected trajectory plans. The method may be iteratively and periodically performed and begin at 400.

At 402, the planning module 106 may receive dimensionality inputs. The inputs may be stored in memory 122 and/or received via the transceivers 132 from a remote device and/or via the display 130 and/or another interface. The dimensionality inputs may be received from a mobile device of a user of the vehicle, a remote central office, a cloud-based network device, etc. via, for example, the transceivers 132 and/or the telematics module 138 from a remote server in, for example, a cloud-based network. The dimensionality inputs may include number of stages for which to plan, number of layers in each of the stages, numbers of dimensions in each stage, number of dimensions in each layer of each stage, limited status of each dimension in each stage, limited status of each dimension in each layer, etc. The dimensionality input may identify the types of dimensions and the limited status of each of the dimensions for each of the layers and stages. The dimensionality inputs may define what a "layer" is and/or what a "stage" is including corresponding durations, corresponding distances, number of layers per stage, etc. As an example, a stage may refer to the vehicle 100 traveling a distance (e.g. 100 meters) or for a future period of time (e.g., 5 seconds). The dimensionality inputs may further include criteria for transitioning between dimensionality levels and/or stages, such as time durations, distances, and/or other transitioning parameters based on which a transition may occur.

Operation 402 allows a user to specify which parts of a planning problem can be eliminated and at which time in the future the parts can be eliminated, fixed and/or limited. For example, the number of possible positions within a lane may be simplified at 5 seconds into the future and a range of possible accelerations may be simplified (or reduced) after 8 seconds into the future. The planning module 106 is configured to formulate required connections to assure that a feasible trajectory is selected that meets kinematic and dynamic limitations for a duration of a planned future time horizon.

At 404, the planning module 106 may start the process timer 129, which may be used as an input for 406.

At 406, the planning module 106 may receive and/or collect data for initializing a planning problem and estimating states of dimensions at a predetermined number of time steps into the future. The inputs may be received from the transceivers 132, the sensors 142, and/or the telematics module 138. At 406A, the planning module 106 may collect sensor data from the sensors 142 and MAP data from the telematics module 138. The sensor and/or MAP data may include any of the above-stated environmental information, such as object locations, object speeds relative to the vehicle 100, object accelerations relative to the vehicle 100, object headings, location of the vehicle 100, heading of the vehicle 100, speed and acceleration of the vehicle 100, and/or other objects and vehicle dynamic information. In an embodiment, the MAP data may be received via the transceivers 132 and/or the telematics module 138 from a remote server in, for example, a cloud-based network. At 406B, the planning module 106 may collect dimensionality parameters and criteria received at 402.

At 406C, the planning module 106 may receive a destination input and requests (collectively referred to as the "goal"), for example, from the transceivers 132, the RF circuits 136, the display 130, and/or the telematics module 138 from, for example, a mobile device (e.g., a smart phone) and/or a remote server in a cloud-based network. Multiple goals may be provided. The destination input and requests may include an address of a destination and/or traveling and destination requests, such as where to park, maximum traveling speed relative to speed limits, routes to avoid, separation distances to maintain between the ego vehicle 100 and other vehicles, etc.

At 408, the planning module 106 initializes the planning problem for planning a trajectory and corresponding operations performed. This operation is performed to setup the planning module 106 for what is to be solved, etc. At 408A, the planning module 106 may load precomputed data, such as dimensions of the vehicle 100, characteristics of the vehicle 100, how many different actions can occur from one stage and/or layer to a next stage and/or layer, etc. Numerous different actions may be possible, such as making a soft, normal, or hard left turn, a soft, normal or hard right turn, maintaining a straight ahead heading, accelerating, decelerating, increasing speed, decreasing speed, etc. This may include determining what the dimensions are and how the dimensions may be changed over time. The stated operation may further include establishing the initial dimensionality for a first layer of a first stage.

At 408B, the planning module 106 may define nodes of a plan and perform pre-calculations on edges between nodes. A node may refer to a current or predicted future location of the vehicle 100 and corresponding values of dimensions for a particular state of the vehicle 100 at the corresponding time. Different possible states of dimensions may be generated based on each node. The planning module 106 may be a graph-based planner and determine how to transition between states and what is a best sequence to follow when transitioning between the states. As an example, when the vehicle 100 is driving down a road, the vehicle 100 may continue straight, merge left, turn left, merge right, turn right, speed up, slow down, accelerate, decelerate, etc. The planning module 106 may determine for each future instance in time what are the possible states of the dimensions of concern. There are various possible outcomes and the planning module 106 may define what the possible outcomes are and the corresponding changes in the dimensions.

At 408C, the planning module 106, if not already performed, may establish an initial dimensionality. This may include identification of the initial active limitations, an initial number of active unlimited dimensions, a number of limited dimensions (if any), limited statuses of the limited dimensions, and transition criteria for transitioning between stages. The transition criteria may include the conditions based on which transitioning decisions are made.

At 408D, the planning module 106 may set use flags, stored in the memory 122, for the initial dimensions to TRUE. This indicates that the initial dimensions are active. At 408E, the planning module 106 initialize the dimension counter to 0 and the stage counter to 1. At 408F, the planning module 106 may set a current initial state $S_{init}$ of plan, as shown by equation 1, where $D_{1init}, D_{2init}, \ldots, D_{Ninit}$ refer to the initial values for each of the active initial dimensions and N is the number of initial dimensions. The state $S_{init}$ is added to the list of potential next states, referred to as the open list and stored in memory 122.

$$S_{init} = \{D_{1init}, D_{2init}, \ldots, D_{Ninit}\} \quad (1)$$

At 410, the planning module 106, if not already set, sets the state based on which a next successor list Succ is to be generated. If this is a first iteration of the method for generating a current plan, then the state has been set at 408F. If this is a second iteration of the method for generating the current plan, then the planning module 106 may use the best state determined at 420.

At 412, the planning module 106 generates the successor list Succ based on the state set at 410. Operation 412 may be performed for each active dimension of the current stage. Each iteration of operation 412 includes determining the possible values of the current dimension for the current stage.

The planning module 106 may implement a dimension hierarchy to include (i) more dimensions and/or less limited dimensions for planning of states at future distances or times close to a current location or time of the vehicle 100, and (ii) more limited and/or fewer dimensions for more distant planning (i.e., distances or times associated with locations further away from the current location of the vehicle 100). The dimension hierarchy may be determined at 402 or elsewhere and indicate the order of dimensions for each layer and/or stage to evaluate. For example, if the dimensions of position, velocity and acceleration are evaluated, the following operations may be performed first for position, then for velocity and finally for acceleration. The hierarchy may be selected and/or provided as an input at 402.

At 412A, the planning module 106 determines whether the criteria to transition to a next stage has been satisfied and/or whether the current dimension should be skipped. The criteria may include a time threshold from start of the current stage, a distance traveled threshold from a start of the current stage, and/or other transition criterion. As an example, if the first dimension is location (or position) of the vehicle 100 and the second dimension is velocity, the first dimension may be skipped because the possible states associated with the different possible locations may be covered when performing operation 412 for the second dimension. For example, when operation 412 is performed for velocity, each possible velocity value for each possible location may be determined.

The criteria may include distances, times, and/or tree depths of when to perform transitions. As an example, transitions may occur at 5, 15, and 25 seconds into the future. As another example, transitions may occur at 10, 20, 30 seconds into the future. As yet another example, transitions may occur at 100 meters, 150 meters, and 200 meters into the future and relative to a current position. For a trajectory path being determined and a single iteration of the multi-dimensional planning method, the dimensionality decreases over time and does not increase over time. For a stage occurring after the first stage, the number of possible states is less than the number of possible states for previous stages.

In one embodiment, one or more dimensions are maintained in an active state for all stages. For example, the dimensions of velocity, acceleration and time may be maintained active for all stages. In one embodiment, velocity and acceleration are maintained active for all stages. The velocity, acceleration and/or time dimensions may be limited for stages after the first stage. In one embodiment, the velocity and acceleration dimensions are limited for stages after the first stage.

If the criteria are satisfied and/or the current dimension should be skipped, operation 412B is performed, otherwise operation 412C is performed. At 412B, the planning module 106 increments the stage counter and changes the dimensionality including setting use flags for one or more dimensions that are dropped to FALSE. The dimensionality may be changed as described herein and include changes to the number of active dimensions, changes to limited statuses of one or more dimensions, etc.

At 412C, the planning module 106 increments the dimension counter. The planning module selectively performs each of operations 412D-M for each active dimension. The dimension counter may identify the current dimension, which is selected in the order of the dimension hierarchy.

At 412D, the planning module 106 determines when the current dimension is dropped for the current stage. If yes, operation 412M is performed. If no, operation 412E may be performed.

At 412E, the planning module 106 determines whether the current dimension is limited for the current stage. If yes, operations 412F may be performed, otherwise operation 412H may be performed.

At 412F, the planning module 106 generates possible values of the current dimension based on the one or more conditions limiting the current dimension. The possible values may be equal to (i) one or more amounts of increase in a current value, (ii) the current value, and/or (iii) one or more amounts of decrease in the current value.

At 412G, the planning module 106 determines possible states based on the determined possible values of the current dimension and each state determined in a last iteration of operation 412 including the previously covered dimensions (i.e., dimensions for which operation 412 has been performed) while dropping duplicate states. If this is a first iteration operations 412C-412M, then the previously covered dimensions simply refer to the initial values of the dimensions determined and 408F. If this is not the first iteration of operations 412C-412M, then the previously covered dimensions refer to the dimensions for which operation 412 has been performed. This may include the possible values of the one or more dimensions determined in the one or more previous iterations of operation 412 and/or states with combinations of possible values for different dimensions. For example, if this is the third iteration of operation 412 and the first dimension is position, the second dimension is velocity and the third dimension is acceleration, then operation 412G may include determining the possible values of acceleration for the current stage and for each of the previously determined possible values of velocity determined during the last iteration of operation 412. The resultant states are stored as part of the successor list Succ in the memory 122.

At 412H, the planning module 106 determines whether the current dimension is fixed for the current stage. If yes, operation 412I may be performed, otherwise operation 412K may be performed.

At 412I, the planning module 106 generates a single possible subsequent fixed value of the current dimension. This may be the current value of the dimension or another fixed value. At 412J, the planning module 106 determines possible states based on the fixed value of the current dimension and each state determined in a last iteration of operation 412 including the previously covered dimensions while dropping duplicate states. The resultant states are stored as part of the successor list Succ.

At 412K, the planning module 106 generates possible subsequent values of the current dimension. If operation 412K is performed, then the current dimension is active and unlimited. At 412L, the planning module 106 determines possible states based on the possible values of the current dimension and each state determined in a last iteration of operation 412 including the previously covered dimensions while dropping duplicate states. The resultant states are stored as part of the successor list Succ.

At 412M, the planning module 106 determines whether there is another dimension for the current stage. If yes, operation 412C may be performed, otherwise operation 414 may be performed.

At 414, the planning module 106 scores (i) each of the states of the successor list Succ populated by 412G, 412J, and 412L since the last invocation of 414 and/or (ii) each of the trajectory plans respectively of these states. Each plan may include a set of states, from the initial state to a last estimated state along a path. Each plan has values of the dimensions of each state along the path. The dimensionality may be decreasing along the path. Each state has a set of possible values, one for each of the dimensions associated with that state. A state refers one possible set of values for the dimensions associated with that state.

The scores may be based on a cost function, where low scores are better than high scores. The cost function may assign a cost value (or score) to each state and/or associated plan in the successor list Succ. The cost value may be based on: how comfortable the plan is to a passenger; estimated amount of fuel to be consumed if plan followed; length of traveling distance of plan; time to follow the plan; distances from objects, pedestrian, and/or obstacles if plan followed; whether speed limits are exceeded if plan followed; how close to speed limits the vehicle will be if plan followed; estimations of whether the vehicle remains fully on roads associated with the plan; etc. including any combination of these or other factors.

At 416, the planning module 106 adds the successor list Succ and corresponding states, plans and scores to the open list, which includes previously determined states, plans and scores. At 418, the planning module 106 sorts the open list based on the scores.

At 420, the planning module 106 selects a best state and/or plan having the best score (or cost value). The best score may refer to the lowest score (or cost value). In an alternative embodiment, the state and/or plan having the lowest cost value may be given the highest score.

At 422, the planning module 106 determines whether the planning process is completed for the current iteration of the method. The planning process may be completed when the plan with the best score satisfies the one or more goals set at 406C. If the one or more goals are not satisfied, then the planning process is not completed. If yes, operation 424 may be performed, otherwise operation 410 may be performed to find another path to the one or more goals. In one embodiment, the plan that satisfies the one or more set goals and has the best score is the "cheapest" plan. The "cheapest" plan may defined as a plan that is most efficient (least amount of traveling time, least amount of traveling miles, least amount of fuel and/or power used, etc.). The cheapest plan may be defined differently than stated.

At 424, the actuator module 108 may perform operations to follow the plan selected at 420. The plan may include speeds, accelerations, turning operations, braking operations, signaling operations, and/or other operations and timing and/or locations where to perform these operations. When the vehicle 100 is a fully autonomous vehicle, this may include controlling the engine 170, the converter/generator 172, the transmission 174, the lighting system 182, the brake system 188, the motors 190, and the steering system 192 to performed the selected plan. When the vehicle 100 is not a fully autonomous vehicle, the actuator module 108 may assist a driver to follow the selected plan. This may include providing instructions to a driver via, for example, the display 130 to execute the selected plan.

At 426, the planning module 106 and/or the vehicle control module 110 may determine whether the process timer has exceeded a threshold. The described method may be periodically performed. As an example, the method may be performed every 100 milliseconds or 10 times a second. If yes, operation 428 may be performed, otherwise operation 424 may be performed. The selected plan may be followed until a new plan is selected. At 428, the planning module 106 and/or the vehicle control module 110 may reset the process timer and return to operation 406.

The above-described MDPS 101 and planning method allows for planning variables (or dimensions) to be eliminated or reduced at longer time intervals into the future, which drastically reduces computational load. The MDPS 101 allows for users to designate which variables are dropped, fixed, and/or limited and at which points in the future the variables are dropped, fixed and/or limited. The planning module 106 then determines the maneuvers for the vehicle 100 to make given the provided constraints. By integrating dimensions in a single consistent planning framework, a best path of determined possible paths is able to be determined while providing a robust system simplifying testing and validating procedures.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A multi-dimensional trajectory planning system comprising:
a memory configured to store map data, sensor data from sensors of a vehicle, and a planning application;
a planning module configured to execute the planning application to
determine a first dimensionality including a first set of dimensions for a first stage of a planning process, wherein the first set of dimensions include a plurality of variables, wherein each of the first set of dimensions are active and thus being estimated for the first stage and layer in time, and wherein the first set of dimensions includes two or more dimensions,
determine a second dimensionality including a second set of dimensions for a second stage of the planning process, wherein the second set of dimensions includes a subset of the first set of dimensions, and wherein the second stage has a lower level of dimensionality than the first stage;
based on the map data and the sensor data,
estimate first possible future states of the first set of dimensions for the first stage, and
estimate second possible future states of the second set of dimensions for the second stage based on values of the first possible future states,
wherein the first possible future states occur in the future subsequent to a current state of the vehicle at a current moment in time, and wherein the second possible future states occur in the future subsequent to the first possible future states, and
select a trajectory plan based on the second possible future states; and
an actuator module configured to drive the vehicle along a trajectory defined by the selected trajectory plan, wherein
the term dimensionality refers to a number of active dimensions being estimated for a current stage and layer in time, and
the current stage and layer in time refers to the stage and layer in time being currently estimated, not necessarily to a current moment in time.

2. The multi-dimensional trajectory planning system of claim 1, wherein one or more dimensions in the first set of dimensions is limited.

3. The multi-dimensional trajectory planning system of claim 2, wherein the one or more dimensions in the first set of dimensions is limited such that the one or more dimensions at least one of i) include a reduced number of states for each of the first set of dimensions, and ii) are fixed in value.

4. The multi-dimensional trajectory planning system of claim 1, wherein one or more dimensions in the second set of dimensions is limited.

5. The multi-dimensional trajectory planning system of claim 1, wherein the second set of dimensions includes only the subset of the dimensions in the first set of dimensions.

6. The multi-dimensional trajectory planning system of claim 1, wherein:
the first stage includes a first one or more layers;
the second stage includes a second one or more layers; and
each of the first one or more layers and each of the second one or more layers is defined as being a predetermined number of one or more clock cycles for a respective future period subsequent to the current moment in time.

7. The multi-dimensional trajectory planning system of claim 1, wherein:
the first stage includes a first one or more layers;
the second stage includes a second one or more layers; and
each of the first one or more layers and each of the second one or more layers is defined as being a respective predetermined distance from a current location of the vehicle.

8. The multi-dimensional trajectory planning system of claim 1, wherein the planning module is configured to:
  reduce dimensionality two or more times for transitioning between three or more stages, the three or more stages including the first stage and the second stage;
  determine possible future states for each of the three or more stages;
  generate scores via a cost function by at least one of (i) scoring each of the possible future states of a last one of the three or more stages, or (ii) scoring a plan of each of the possible future states of a last one of the three or more stages; and
  select the trajectory plan based on the scores.

9. The multi-dimensional trajectory planning system of claim 1, wherein the planning module is configured to:
  reduce dimensionality three or more times for transitioning between four or more stages, the four or more stages including the first stage and the second stage;
  determine possible future states for each of the four or more stages;
  generate scores by at least one of (i) scoring each of the possible future states of a last one of the four or more stages, or (ii) scoring a plan of each of the possible future states of a last one of the four or more stages; and
  select the trajectory plan based on the scores.

10. The multi-dimensional trajectory planning system of claim 1, wherein the planning module is configured to maintain active a velocity dimension and an acceleration dimension for two or more stages, the two or more stages including the first stage and the second stage.

11. The multi-dimensional trajectory planning system of claim 1, wherein the planning module is configured to maintain active a velocity dimension and an acceleration dimension for three or more stages, the three or more stages including the first stage and the second stage.

12. The multi-dimensional trajectory planning system of claim 1, wherein the planning module is configured to maintain one or more dimensions of the first set of dimensions active for each reduction in dimensionality of the planning process to select the trajectory plan and fixes or limits one or more dimensions of the first set of dimensions when transitioning between stages including transitioning between the first stage and the second stage.

13. The multi-dimensional trajectory planning system of claim 1, wherein the planning module is configured, when transitioning between the first stage and the second stage and when transitioning between the second stage and a third stage, to drop, fix or limit one or more dimensions of the first set of dimensions.

14. The multi-dimensional trajectory planning system of claim 1, wherein the planning module is configured, when limiting one or more dimensions for the second stage, to further limit possible states of the one or more dimensions than previously limited for the first stage such that there are fewer possible states for the second stage.

15. The multi-dimensional trajectory planning system of claim 1, wherein the second set of dimensions includes the dimensions in the first set of dimensions and one or more of the dimensions in the second set of dimensions is more limited than a same one or more dimensions in the first set of dimensions.

16. The multi-dimensional trajectory planning system of claim 1, wherein the planning module is configured, based on the map data and the sensor data, to:
  estimate the first possible future states of the first set of dimensions for one or more layers of the first stage; and
  estimate the second possible future states of the second set of dimensions for one or more layers of the second stage based on the first possible future states.

17. The multi-dimensional trajectory planning system of claim 1, wherein the planning module is configured to:
  generate first scores by scoring the second possible future states or scoring plans of the second possible future states, and
  select the trajectory plan based on the first scores.

18. The multi-dimensional trajectory planning system of claim 17, wherein the planning module is configured to:
  add the second possible future states to a list along with the first scores of the second possible future states, wherein the list includes (i) previously estimated possible future states estimated prior to estimating the first possible future states and the second possible future states, and (ii) second scores of the previously estimated possible future states; and
  select the trajectory plan based on the first scores and the second scores.

19. The multi-dimensional trajectory planning system of claim 1, wherein the first set of dimensions includes three or more dimensions.

20. The multi-dimensional trajectory planning system of claim 1, wherein the first stage of the planning process includes a limited status of each of the first set of dimensions for one or more cycles of the planning process.

21. The multi-dimensional trajectory planning system of claim 1, further comprising:
  the sensors;
  a steering system;
  a brake system; and
  a propulsion device,
  wherein the actuator module is configured to control operation of the steering system, the brake system and the propulsion device when driving the vehicle to follow the selected trajectory plan.

22. A multi-dimensional trajectory planning method comprising:
  receiving map data;
  receiving sensor data from sensors of a vehicle;
  determining a first dimensionality including a first set of dimensions for a first stage of a planning process, wherein the first set of dimensions include a plurality of variables, wherein each of the first set of dimensions are active and thus being estimated for the first stage and layer in time, and wherein the first set of dimensions includes two or more dimensions;
  determining a second dimensionality including a second set of dimensions for a second stage of the planning process, wherein the second set of dimensions includes a subset of the first set of dimensions, and wherein the second stage has a lower level of dimensionality than the first stage;
  based on the map data and the sensor data,
    estimating first possible future states of the first set of dimensions for the first stage, and
    estimating second possible future states of the second set of dimensions for the second stage based on values of the first possible future states,
    wherein the first possible future states occur in the future subsequent to a current state of the vehicle at a current moment in time, and wherein the second possible future states occur in the future subsequent to the first possible future states;
  selecting a trajectory plan based on the second possible future states; and driving the vehicle along a trajectory defined by the selected trajectory plan, wherein the term dimensionality refers to a number of active dimensions being estimated for a current stage and layer in time, and the current stage and layer in time refers to the stage and layer in time being currently estimated, not necessarily to a current moment in time.

23. The method of claim 22, wherein:

one or more dimensions in the first set of dimensions is limited; and one or more dimensions in the second set of dimensions is limited.

24. The method of claim 22, wherein the second set of dimensions includes only the subset of the dimensions in the first set of dimensions.

25. The method of claim 22, wherein:

the first stage includes a first one or more layers;

the second stage includes a second one or more layers; and each of the first one or more layers and each of the second one or more layers is defined as being a predetermined number of one or more clock cycles for a respective future period subsequent to the current moment in time.

26. The method of claim 22, wherein:

the first stage includes a first one or more layers;

the second stage includes a second one or more layers; and each of the first one or more layers and each of the second one or more layers is defined as being a respective predetermined distance from a current location of the vehicle.

27. The method of claim 22, further comprising:

reducing dimensionality two or more times for transitioning between three or more stages, the three or more stages including the first stage and the second stage;

determining possible future states for each of the three or more stages;

generating scores via a cost function by at least one of (i) scoring each of the possible future states of a last one of the three or more stages, or (ii) scoring a plan of each of the possible future states of a last one of the three or more stages; and selecting the trajectory plan based on the scores.

28. The method of claim 22, further comprising maintaining active a velocity dimension and an acceleration dimension for two or more stages, wherein the two or more stages including the first stage and the second stage.

29. The method of claim 22, further comprising maintaining one or more dimensions of the first set of dimensions active for each reduction in dimensionality of the planning process to select the trajectory plan and fixes or limits one or more dimensions of the first set of dimensions when transitioning between stages including transitioning between the first stage and the second stage.

30. The method of claim 22, further comprising, when transitioning between the first stage and the second stage and when transitioning between the second stage and a third stage, dropping, fixing or limiting one or more dimensions of the first set of dimensions.

31. The method of claim 22, further comprising, when limiting one or more dimensions for the second stage, further limiting possible states of the one or more dimensions than previously limited for the first stage such that there are fewer possible states for the second stage.

32. The method of claim 22, wherein the second set of dimensions includes the dimensions in the first set of dimensions and one or more of the dimensions in the second set of dimensions is more limited than a same one or more dimensions in the first set of dimensions.

33. The method of claim 22, further comprising, based on the map data and the sensor data:

estimating the first possible future states of the first set of dimensions for one or more layers of the first stage; and estimating the second possible future states of the second set of dimensions for one or more layers of the second stage based on the first possible future states.

34. The method of claim 22, further comprising:

generating first scores by scoring the second possible future states or scoring plans of the second possible future states; and selecting the trajectory plan based on the first scores.

35. The method of claim 34, further comprising:

adding the second possible future states to a list along with the first scores of the second possible future states, wherein the list includes (i) previously estimated possible future states estimated prior to estimating the first possible future states and the second possible future states, and (ii) second scores of the previously estimated possible future states; and selecting the trajectory plan based on the first scores and the second scores.

36. The method of claim 22, wherein the first set of dimensions includes three or more dimensions.

\* \* \* \* \*